(12) United States Patent
Nishikawa et al.

(10) Patent No.: US 12,109,958 B2
(45) Date of Patent: Oct. 8, 2024

(54) IN-VEHICLE SEMICONDUCTOR CIRCUIT AND SEMICONDUCTOR CIRCUIT

(71) Applicant: FUJI ELECTRIC CO., LTD., Kawasaki (JP)

(72) Inventors: Mutsuo Nishikawa, Matsumoto (JP); Hirofumi Kato, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 254 days.

(21) Appl. No.: 17/456,577

(22) Filed: Nov. 25, 2021

(65) Prior Publication Data
US 2022/0080907 A1 Mar. 17, 2022

Related U.S. Application Data

(63) Continuation of application No. PCT/JP2020/041492, filed on Nov. 6, 2020.

(30) Foreign Application Priority Data

Dec. 17, 2019 (JP) ................................ 2019-227401

(51) Int. Cl.
*B60R 16/03* (2006.01)
*B60R 16/023* (2006.01)
(Continued)

(52) U.S. Cl.
CPC .......... *B60R 16/03* (2013.01); *B60R 16/0232* (2013.01); *G08B 21/185* (2013.01);
(Continued)

(58) Field of Classification Search
CPC ... B60R 16/03; B60R 16/0232; G08B 21/185; H02H 1/0007; H02H 3/202; H02H 7/10; H02H 3/18
See application file for complete search history.

(56) References Cited

U.S. PATENT DOCUMENTS 6,538,866 B1 3/2003 Hanzawa
10,599,172 B2 * 3/2020 Hayashi .................. G05F 3/16
(Continued)

FOREIGN PATENT DOCUMENTS

CN 101071949 A 11/2007
CN 101420116 A 4/2009
(Continued)

OTHER PUBLICATIONS

International Search Report and (ISA/237) Written Opinion of the International Search Authority for International Patent Application No. PCT/JP2020/041492, mailed by the Japan Patent Office on Dec. 28, 2020.
(Continued)

*Primary Examiner* — Gary L Laxton

(57) ABSTRACT

Provided is a semiconductor circuit connected to a load circuit and configured to control power supply to the load circuit, comprising: a power line to which a power voltage is applied; an overvoltage protection unit that has an output unit configured to interrupt power supply from the power line to the load circuit when the power voltage in the power
(Continued)

line is overvoltage; and a state notification unit configured to notify the outside of a state signal indicating whether the output unit is interrupting the power supply.

20 Claims, 15 Drawing Sheets

(51) Int. Cl.
  *G08B 21/18* (2006.01)
  *H02H 1/00* (2006.01)
  *H02H 3/20* (2006.01)
  *H02H 7/10* (2006.01)
  *H02H 3/18* (2006.01)
(52) U.S. Cl.
  CPC .......... *H02H 1/0007* (2013.01); *H02H 3/202* (2013.01); *H02H 7/10* (2013.01); *H02H 3/18* (2013.01)

(56) References Cited

U.S. PATENT DOCUMENTS

| | | | |
|---|---|---|---|
| 2003/0197513 A1 | 10/2003 | Uematsu | |
| 2003/0214769 A1 | 11/2003 | Nishikawa | |
| 2005/0184715 A1* | 8/2005 | Kidokoro | ......... H03K 17/08104 323/282 |
| 2007/0290655 A1 | 12/2007 | Nate | |
| 2008/0106829 A1* | 5/2008 | Sumimoto | .............. H02P 9/102 361/21 |
| 2010/0123979 A1* | 5/2010 | Naito | ........................ G06F 1/30 361/18 |
| 2012/0268079 A1 | 10/2012 | Nakamura | |
| 2014/0111899 A1 | 4/2014 | Lin | |
| 2019/0165561 A1 | 5/2019 | Sawano | |
| 2020/0099215 A1* | 3/2020 | Ishino | ..................... H02M 1/32 |

FOREIGN PATENT DOCUMENTS

| | | |
|---|---|---|
| CN | 103444067 A | 12/2013 |
| CN | 103779829 A | 5/2014 |
| CN | 108155635 A | 6/2018 |
| JP | S55087126 U | 6/1980 |
| JP | 2000332207 A | 11/2000 |
| JP | 2003303890 A | 10/2003 |
| JP | 3899984 B2 | 3/2007 |
| JP | 3918614 B2 | 5/2007 |
| JP | 2007195330 A | 8/2007 |
| JP | 2018026901 A | 2/2018 |
| JP | 2018152391 A | 9/2018 |
| JP | 2019097338 A | 6/2019 |

OTHER PUBLICATIONS

Office Action issued for counterpart Japanese Application No. 2021-565358, issued by the Japanese Patent Office on Nov. 15, 2022 (drafted on Nov. 9, 2022).

Office Action issued for related Chinese Application 202080040728, issued by The State Intellectual Property Offive of People's Republic of China on Aug. 7, 2024.

\* cited by examiner

IN-VEHICLE SEMICONDUCTOR CIRCUIT AND SEMICONDUCTOR CIRCUIT

The contents of the following Japanese patent applications are incorporated herein by reference:
NO. 2019-227401 filed in JP on Dec. 17, 2019, and
PCT/JP2020/041492 filed in WO on Nov. 6, 2020.

BACKGROUND

1. Technical Field

The present invention relates to an in-vehicle semiconductor circuit having an overvoltage protection function and a failure detecting function.

2. Related Art

A semiconductor circuit has been known that has an overvoltage protection function to protect a circuit when overvoltage is applied (see Patent Document 1, for example). Moreover, a semiconductor circuit has also been devised that has a failure detecting function to notify the outside of a failure state (see Patent Document 2, for example).
Patent Document 1: Japanese Patent No. 3899984.
Patent Document 2: Japanese Patent No. 3918614.

Technical Problem

It is preferable that the in-vehicle semiconductor circuit can notify the outside that overvoltage is applied, even when the overvoltage is applied.

SUMMARY

According to a first aspect of the present invention, an in-vehicle semiconductor circuit is provided. The in-vehicle semiconductor circuit may be connected to a load circuit. The in-vehicle semiconductor circuit may control power supply to the load circuit. The in-vehicle semiconductor circuit may include a power line. A power voltage may be applied to the power line. The in-vehicle semiconductor circuit may include an overvoltage protection unit. The overvoltage protection unit may have an output unit. The output unit may interrupt power supply from the power line to the load circuit when the power voltage in the power line is overvoltage. The in-vehicle semiconductor circuit may include a state notification unit. The state notification unit may notify the outside of a state signal indicating whether the output unit is interrupting the power supply.

The state notification unit may generate the state signal based on voltage of a detection node. The voltage of the detection node may be potential that differs in the overvoltage protection unit depending on whether the power supply is being interrupted or the power supply is not being interrupted.

The in-vehicle semiconductor circuit may include a reference potential line. Reference potential may be applied to the reference potential line. The state notification unit may have a state notification line. The state notification line may transmit the state signal to the outside. The state notification unit may have a state notification switch. The state notification switch may switch between connecting and not connecting the state notification line to the reference potential line depending on the voltage of the detection node. The state notification switch may switch between connecting and not connecting the state notification line to the power line depending on the voltage of the detection node. The state notification switch may switch between connecting and not connecting the state notification line to the load circuit depending on the voltage of the detection node.

The in-vehicle semiconductor circuit may include an output line. The output line may be connected to the load circuit. The output unit may be an output transistor. The output transistor may switch between connecting and not connecting the power line to the output line. The state notification unit may detect voltage of a gate terminal of the output transistor as the voltage of the detection node.

The overvoltage protection unit may have a protection transistor. The protection transistor may be provided between the power line and the reference potential line. The protection transistor may select either voltage corresponding to the power voltage or voltage corresponding to the reference potential depending on magnitude of the power voltage, to apply the selected voltage to the gate terminal of the output transistor. The state notification unit may detect the voltage outputted by the protection transistor to the gate terminal as the voltage of the detection node.

The overvoltage protection unit may have a Zener diode. The overvoltage protection unit may have a first resistance element. The first resistance element may be connected in series to the Zener diode. Voltage at a connecting point between the Zener diode and the first resistance element may be applied to a gate terminal of the protection transistor. The state notification unit may detect the voltage at the connecting point between the Zener diode and the first resistance element as the voltage of the detection node. The state notification unit may detect voltage of the output line as the voltage of the detection node.

The in-vehicle semiconductor circuit may include a disconnection detection unit. The disconnection detection unit may be connected to the power line, the reference potential line, and the state notification line. The disconnection detection unit may notify the outside of a disconnection signal indicating whether the in-vehicle semiconductor circuit is disconnected.

The disconnection detection unit may have a second resistance element connected between the power line and the state notification line. The disconnection detection unit may have a third resistance element connected between the state notification line and the reference potential line. The disconnection detection unit may have a fourth resistance element connected between the power line and the reference potential line.

The state notification line may transmit the disconnection signal to the outside. The state notification line may transmit the state signal and the disconnection signal to the outside in different voltage ranges.

According to a second aspect of the present invention, a semiconductor circuit is provided. The semiconductor circuit may be connected to the load circuit. The semiconductor circuit may control power supply to the load circuit. The semiconductor circuit may include a power line. A power voltage may be applied to the power line. The semiconductor circuit may include an overvoltage protection unit. The overvoltage protection unit may have an output unit. The output unit may interrupt the power supply from the power line to the load circuit when the power voltage in the power line is overvoltage. The semiconductor circuit may include a state notification unit. The state notification unit may notify the outside of a state signal indicating whether the output unit is interrupting the power supply. The semiconductor circuit may include a disconnection detection unit.

The disconnection detection unit may notify the outside of a disconnection signal indicating whether the semiconductor circuit is disconnected. The semiconductor circuit may include a state notification line. The state notification line may transmit the state signal and the disconnection signal to the outside.

The load circuit may be a pressure sensor.

DESCRIPTION OF EXEMPLARY EMBODIMENTS

Hereinafter, the present invention will be described through embodiments of the invention, but the following embodiments do not limit the claimed invention. Moreover, not all combinations of features described in the embodiments are necessary to solutions of the invention.

Figure 1:
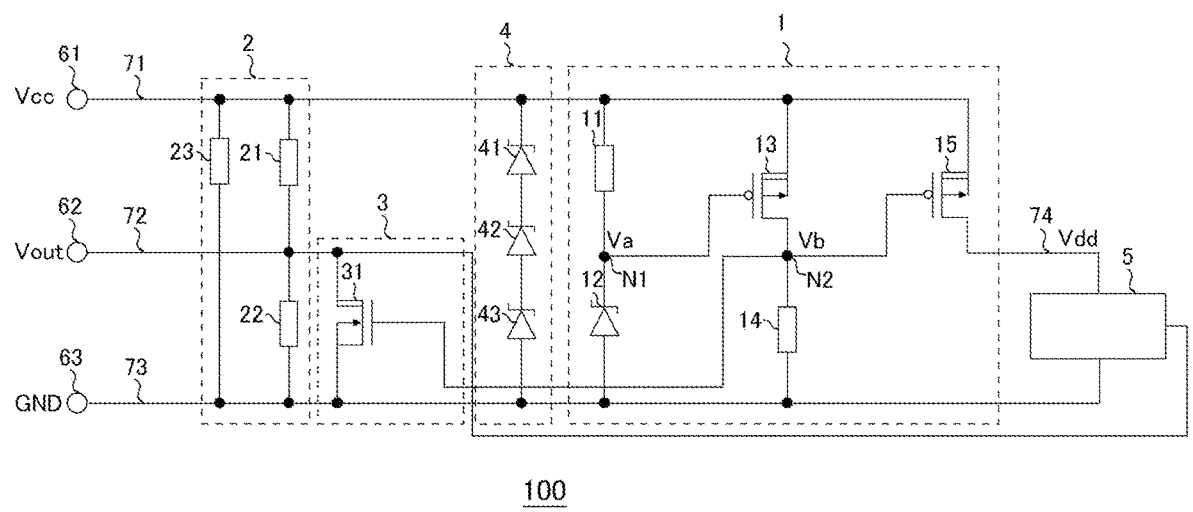
FIG. 1 shows an example of a configuration of a semiconductor circuit 100 according to one embodiment of the present invention.

FIG. 1 shows an example of a configuration of a semiconductor circuit 100 according to one embodiment of the present invention. The semiconductor circuit 100 of this example may be an in-vehicle semiconductor circuit. The semiconductor circuit 100 of this example includes an overvoltage protection unit 1, a disconnection detection unit 2, a state notification unit 3, a reverse connection protection unit 4, and a load circuit 5. Moreover, the semiconductor circuit 100 of this example includes a power terminal 61, an output terminal 62, a reference potential terminal 63, an internal power line 71, an internal state notification line 72, an internal reference potential line 73, and an output line 74 in order to operate the overvoltage protection unit 1, the disconnection detection unit 2, the state notification unit 3, the reverse connection protection unit 4, and the load circuit 5. The overvoltage protection unit 1, the disconnection detection unit 2, the state notification unit 3, the reverse connection protection unit 4, and the load circuit 5 may be formed on the same semiconductor substrate. Moreover, in this example, the semiconductor circuit 100 includes the load circuit 5, but the semiconductor circuit 100 does not need to include any load circuit 5. That is, the semiconductor circuit 100 may be configured to be connected to the load circuit 5 located outside.

The power terminal 61 is a terminal to which a power voltage Vcc is supplied from an external power source. The output terminal 62 is a terminal that outputs an output voltage Vout to the outside. The reference potential terminal 63 is a terminal to which a ground voltage GND is supplied from the outside. The power terminal 61, the output terminal 62, and the reference potential terminal 63 are respectively connected to the internal power line 71, the internal state notification line 72, and the internal reference potential line 73. The internal power line 71 is an example of a power line. The internal state notification line 72 is an example of a state notification line. The internal reference potential line 73 is an example of a reference potential line. The external power voltage Vcc is supplied to the overvoltage protection unit 1, the disconnection detection unit 2, and the reverse connection protection unit 4 via the internal power line 71. In other words, the power voltage Vcc may be applied to the internal power line 71. The output voltage Vout is outputted from the disconnection detection unit 2, the state notification unit 3, and the load circuit 5 to the outside via the internal state notification line 72. The external ground voltage GND (reference potential) is supplied to the overvoltage protection unit 1, the disconnection detection unit 2, the state notification unit 3, the reverse connection protection unit 4, and the load circuit 5 via the internal reference potential line 73. In other words, the ground voltage GND (reference potential) may be applied to the internal reference potential line 73. Note that the ground voltage GND may be referred to as reference potential in this specification.

The overvoltage protection unit 1 is connected to the internal power line 71, the internal reference potential line 73, and the output line 74. The overvoltage protection unit 1 supplies a supply voltage Vdd to the load circuit 5 via the output line 74 when the external power voltage Vcc is steady. The overvoltage protection unit 1 may have a function to interrupt the voltage supply from the power line to the load circuit 5 when the external power voltage Vcc is overvoltage. Note that supplying voltage may be referred to as power supply in this specification. The semiconductor circuit 100 may control the power supply to the load circuit 5.

The overvoltage protection unit 1 has a first resistance element 11, a Zener diode 12, a protection transistor 13, a resistance element 14, and an output transistor 15. The first resistance element 11 may be connected in series to the Zener diode 12. The first resistance element 11 may have one end connected to the Zener diode 12 and the other end connected to the internal power line 71. The Zener diode 12 may have a cathode connected to the first resistance element 11 and an anode connected to the internal reference potential line 73. A connecting point between the first resistance element 11 and the Zener diode 12 may be connected to a gate terminal of the protection transistor 13. The connecting point between the first resistance element 11 and the Zener diode 12 is referred to as a connecting point N1. Voltage Va at the connecting point N1 may be applied to the gate terminal of the protection transistor 13.

The protection transistor 13 may be a P type high-voltage MOS transistor. A source terminal of the protection transistor 13 may be connected to the internal power line 71. A drain terminal of the protection transistor 13 may be connected to the resistance element 14 and a gate terminal of the output transistor 15. A connecting point between the drain terminal of the protection transistor 13 and the resistance element 14 is referred to as a connecting point N2. Voltage Vb at the connecting point N2 may be applied to the gate terminal of the output transistor 15. The resistance element 14 may have one end connected to the drain terminal of the protection transistor 13 and the gate terminal of the output transistor 15, and the other end connected to the internal reference potential line 73. The protection transistor 13 may be provided between the internal power line 71 and the internal reference potential line 73.

The output transistor 15 may be a P type high-voltage MOS transistor. A source terminal of the output transistor 15 may be connected to the internal power line 71. A drain terminal of the output transistor 15 may be connected to the load circuit 5. In other words, the output transistor 15 may output the supply voltage Vdd to the load circuit 5. The output transistor 15 is an example of an output unit.

Operation of the overvoltage protection unit 1 will be described. When the external power voltage Vcc is lower than or equal to a breakdown voltage of the Zener diode 12, an absolute value of a difference between the power voltage Vcc and the voltage Va at the connecting point N1 is decreased, and the protection transistor 13 is turned off. When the protection transistor 13 is turned off, the voltage Vb at the connecting point N2 becomes almost the external ground voltage GND. Therefore, the output transistor 15 is turned on, so that the power voltage Vcc is supplied to the load circuit 5.

On the other hand, when the external power voltage Vcc is higher than or equal to the breakdown voltage of the Zener diode 12, the voltage Va at the connecting point N1 is clamped to the breakdown voltage of the Zener diode 12. When the external power voltage Vcc further exceeds a sum of the breakdown voltage of the Zener diode 12 and a threshold voltage of the protection transistor 13 while the voltage Va at the connecting point N1 is clamped to the breakdown voltage, the absolute value of the difference between the power voltage Vcc and the voltage Va at the connecting point N1 is increased, and the protection transistor 13 is turned on. When the external power voltage Vcc exceeds the sum of the breakdown voltage of the Zener diode 12 and the threshold voltage of the protection transistor 13 may be referred to as when the power voltage Vcc is overvoltage. Moreover, when the external power voltage Vcc is lower than or equal to the sum of the breakdown voltage of the Zener diode 12 and the threshold voltage of the protection transistor 13 may be referred to as when the power voltage Vcc is steady.

When the protection transistor 13 is turned on, the voltage Vb at the connecting point N2 becomes almost the power voltage Vcc. Therefore, the output transistor 15 is turned off, so that the power supply to the load circuit 5 is interrupted. That is, the output transistor 15 may interrupt the power supply from the internal power line 71 to the load circuit 5 when the power voltage Vcc in the internal power line 71 is overvoltage. The output transistor 15 may switch between connecting and not connecting the internal power line 71 to the output line 74. The protection transistor 13 may select either voltage corresponding to the power voltage Vcc or voltage corresponding to the reference potential depending on magnitude of the power voltage Vcc, to apply the selected voltage to the gate terminal of the output transistor 15.

According to the operation described above, the overvoltage protection unit 1 supplies the supply voltage Vdd to the load circuit 5 when the power voltage Vcc is steady. Moreover, the overvoltage protection unit 1 interrupts the power supply to the load circuit 5 when the power voltage Vcc is overvoltage. The overvoltage protection unit 1 has a function to interrupt the voltage supply at the time of overvoltage, so that risk for failure of the load circuit 5 can be reduced when overvoltage is applied to the internal power line 71 like when a wiring of the power voltage Vcc is mistaken.

The disconnection detection unit 2 is connected to the internal power line 71, the internal state notification line 72, and the internal reference potential line 73. The disconnection detection unit 2 may detect whether the semiconductor circuit 100 is disconnected, and notify the outside via the internal state notification line 72 of a disconnection signal indicating whether the semiconductor circuit 100 is disconnected. The internal state notification line 72 may transmit the disconnection signal to the outside.

The disconnection detection unit 2 has a second resistance element 21, a third resistance element 22, and a fourth resistance element 23. The second resistance element 21 may have one end connected to the internal power line 71 and the other end connected to the internal state notification line 72. The third resistance element 22 may have one end connected to the internal state notification line 72 and the other end connected to the internal reference potential line 73. The fourth resistance element 23 may have one end connected to the internal power line 71 and the other end connected to the internal reference potential line 73. Detailed operation of the disconnection detection by the disconnection detection unit 2 will be described later.

The state notification unit 3 is connected to the internal state notification line 72 and the internal reference potential line 73. The state notification unit 3 may detect a state signal indicating whether the output transistor 15 is interrupting the power supply, and notify the outside via the internal state notification line 72 of the state signal indicating whether the output transistor 15 is interrupting the power supply. Moreover, the state notification unit 3 may share the internal state notification line 72 with the disconnection detection unit 2. In other words, the internal state notification line 72 may transmit the state signal and the disconnection signal to the outside.

The state notification unit 3 may generate the state signal based on voltage of a detection node. The detection node refers to a node that can detect an on/off state of the overvoltage protection unit 1. That is, the voltage of the detection node refers to potential that differs in the overvoltage protection unit 1 depending on whether the power supply is being interrupted or the power supply is not being interrupted. In this example, the state notification unit 3 is connected to the connecting point N2, so that the voltage of the detection node is the voltage Vb at the connecting point N2. Moreover, the voltage of the detection node may be the voltage Va at the connecting point N1. The voltage of the detection node may be the supply voltage Vdd. Setting the voltage of the detection node to the voltage Vb at the connecting point N2 allows the state notification unit 3 to be realized with a simple circuit configuration. In other words, the state notification unit 3 may detect voltage of the gate terminal of the output transistor 15 as the voltage of the detection node. In other words, the state notification unit 3 may detect the voltage outputted by the protection transistor 13 to the gate terminal as the voltage of the detection node.

A circuit configuration of the state notification unit 3 will be described. The state notification unit 3 may have a state notification switch 31. The state notification switch 31 may be an N type high-voltage MOS transistor. A source terminal of the state notification switch 31 may be connected to the internal reference potential line 73. A drain terminal of the state notification switch 31 may be connected to the internal state notification line 72. A gate terminal of the state notification switch 31 may be connected to the connecting point N2. Moreover, the state notification unit 3 may be configured to have the internal state notification line 72. The internal state notification line 72 transmits the state signal generated by the state notification unit 3 to the outside.

Since the state notification unit 3 is connected to the connecting point N2, the state notification unit 3 performs switching operation according to the voltage Vb at the connecting point N2. When the power voltage Vcc is steady (when the external power voltage Vcc is lower than or equal to the sum of the breakdown voltage of the Zener diode 12 and the threshold voltage of the protection transistor 13), the voltage Vb at the connecting point N2 becomes almost the external ground voltage GND. When the voltage Vb at the connecting point N2 becomes the ground voltage GND, the state notification switch 31 is turned off since it is an N type high-voltage MOS transistor. Therefore, the state notification switch 31 is brought into a high-impedance state and does not affect the output voltage Vout. On the other hand, when the power voltage Vcc is overvoltage (when the external power voltage Vcc exceeds the sum of the breakdown voltage of the Zener diode 12 and the threshold voltage of the protection transistor 13), the voltage Vb at the connecting point N2 becomes almost the power voltage Vcc. Therefore, the state notification switch 31 is turned on, and an impedance from the output terminal 62 to the reference potential terminal 63 is lowered, and the output voltage Vout forcibly becomes the ground voltage GND. The state notification switch 31 may switch between connecting and not connecting the internal state notification line 72 to the internal reference potential line 73 depending on the voltage of the detection node (the voltage Vb at the connecting point N2). The state notification switch 31 connects the internal state notification line 72 to the internal reference potential line 73 when the voltage of the detection node (the voltage Vb at the connecting point N2) becomes almost the power voltage Vcc. This allows notification of an overvoltage state to the outside.

Moreover, since the source terminal of the state notification switch 31 is connected to the internal reference potential line 73, there is no risk of overvoltage being outputted to the output terminal 62, and the external circuit can be safely operated.

The reverse connection protection unit 4 is connected to the internal power line 71 and the internal reference potential line 73. The reverse connection protection unit 4 protects the semiconductor circuit 100 at reverse connection. Reverse connection refers to, for example, a case where a battery of an automobile is reversely connected, and a case where the external ground voltage GND is supplied to the power terminal 61 and the external power voltage Vcc is supplied to the reference potential terminal 63. The reverse connection protection unit 4 has a plurality of Zener diodes (a Zener diode 41, a Zener diode 42, and a Zener diode 43 in this example) connected in series between the internal power line 71 and the internal reference potential line 73. The Zener diode 41 may have a cathode connected to the internal power line 71 and an anode connected to the Zener diode 42. The Zener diode 42 may have a cathode connected to the Zener diode 41 and an anode connected to the Zener diode 43. The Zener diode 43 may have a cathode connected to the Zener diode 42 and an anode connected to the internal reference potential line 73. With the plurality of Zener diodes, the semiconductor circuit 100 can be protected at reverse connection. As an example, the semiconductor circuit 100 can be protected when voltage higher than or equal to 2V is supplied. Moreover, no reverse connection protection unit 4 needs to be provided.

The load circuit 5 is connected to the internal state notification line 72, the internal reference potential line 73, and the output line 74. The output transistor 15 outputs the supply voltage Vdd to the load circuit 5 via the output line 74. The output transistor 15 interrupts the power supply to the load circuit 5 when the power voltage Vcc is overvoltage, so that no overvoltage is applied to the output transistor 15. Moreover, the load circuit 5 outputs voltage to the output terminal 62 via the internal state notification line 72. The load circuit 5 is a pressure sensor, as an example. The load circuit 5 may be an in-vehicle semiconductor pressure sensor. The semiconductor pressure sensor can measure pressure in an intake manifold, for example.

As described above, the semiconductor circuit 100 includes: the overvoltage protection unit 1 having the output unit (output transistor 15) that interrupts the power supply from the internal power line 71 to the load circuit 5 when the power voltage Vcc in the internal power line 71 is overvoltage; and the state notification unit 3 that notifies the outside of the state signal indicating whether the output unit (output transistor 15) is interrupting the power supply. With the overvoltage protection unit 1 and the state notification unit 3, it is possible to notify the outside of an overvoltage state and to detect a failure state on the high-order system side.

Figure 2:
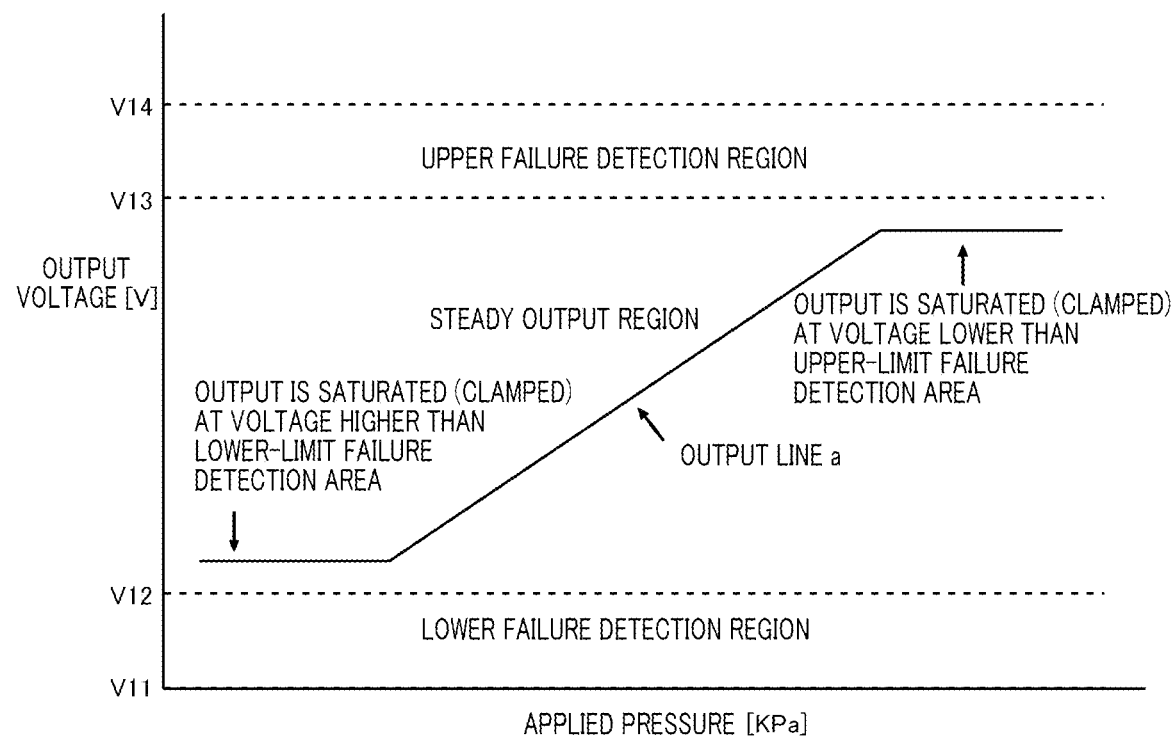
FIG. 2 shows an example of an output voltage Vout characteristic of a load circuit 5 of the semiconductor circuit 100 in the FIG. 1.

FIG. 2 shows an example of an output voltage Vout characteristic of a load circuit 5 of the semiconductor circuit 100 in the FIG. 1. Note that the load circuit 5 is a pressure sensor in FIG. 2. As shown in FIG. 2, when neither overvoltage nor disconnection failure has occurred, the output voltage Vout of the load circuit 5 is varied in a range of a steady output region according to the applied pressure as indicated by an output line a. The range of the steady output region refers to a range from V12 to V13. As an example, the range from V12 to V13 is a range from 0.2V to 4.8V. A saturation voltage (clamp voltage) of the load circuit 5 is set such that the output of the load circuit 5 does not fall within an upper-limit failure detection region and a lower-limit failure detection region. In case of disconnection failure, the output voltage Vout will fall within a range of the upper failure detection region or a range of the lower failure detection region. The range of the upper failure detection region refers to a range from V13 to V14. As an example, the range from V13 to V14 is a range from 4.8V to 5.0V. The range of the lower failure detection region refers to a range from V11 to V12. As an example, the range from V11 to V12 is a range from 0.0V to 0.2V.

When the power voltage Vcc is overvoltage, the state notification switch 31 is turned on, and the output voltage Vout forcibly becomes the ground voltage GND. Therefore, the output voltage Vout will fall within the lower failure detection region ranging from V11 to V12. As described above, since it is possible to detect outside that the output voltage Vout has fallen within the lower failure detection region, the failure state can be detected on the high-order system side.

Figure 3:
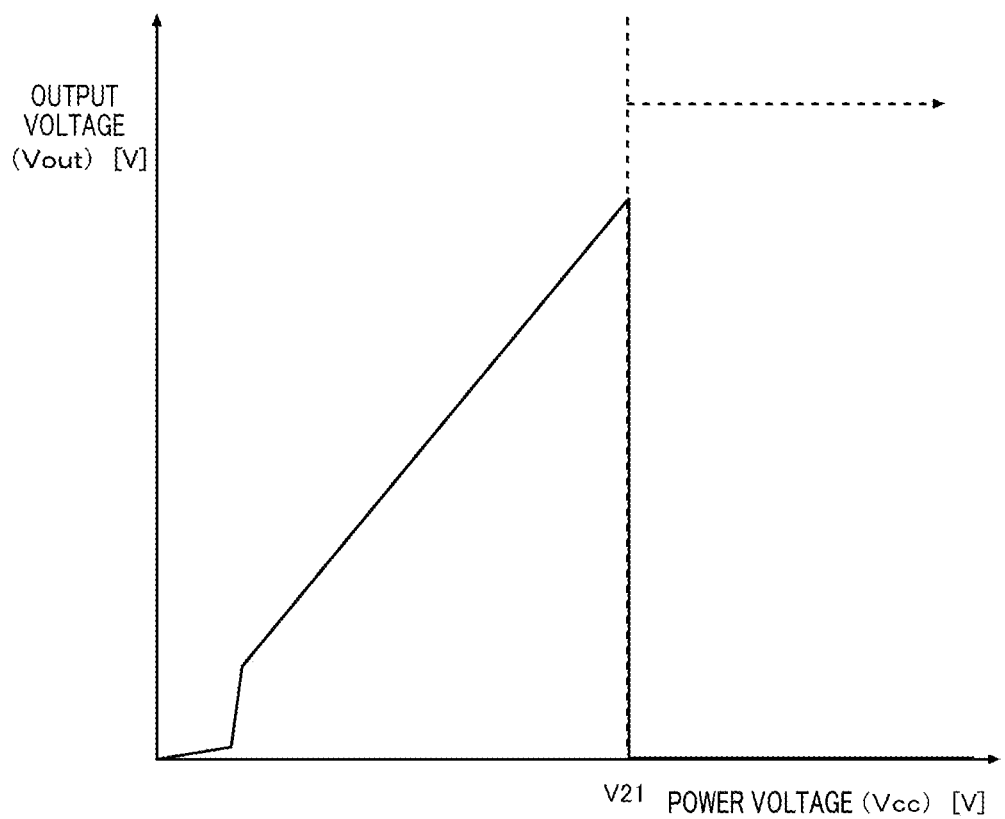
FIG. 3 shows a relationship between an output voltage Vout and a power voltage Vcc of the semiconductor circuit 100.

FIG. 3 shows a relationship between an output voltage Vout and a power voltage Vcc of the semiconductor circuit 100. When the power voltage Vcc is steady (when the power voltage Vcc is lower than or equal to V21), the output voltage Vout is varied between V12 and V13 shown in FIG. 2. V21 is the sum of the breakdown voltage of the Zener diode 12 and the threshold voltage of the protection transistor 13.

On the other hand, when the power voltage Vcc is overvoltage (when the power voltage Vcc exceeds V21), the output voltage Vout becomes about 0V. It is because the state notification switch 31 is turned on and the output voltage Vout forcibly becomes the ground voltage GND that the output voltage Vout becomes about 0V. When the power voltage Vcc becomes overvoltage, the output voltage Vout becomes constant at about 0V.

Figure 4:
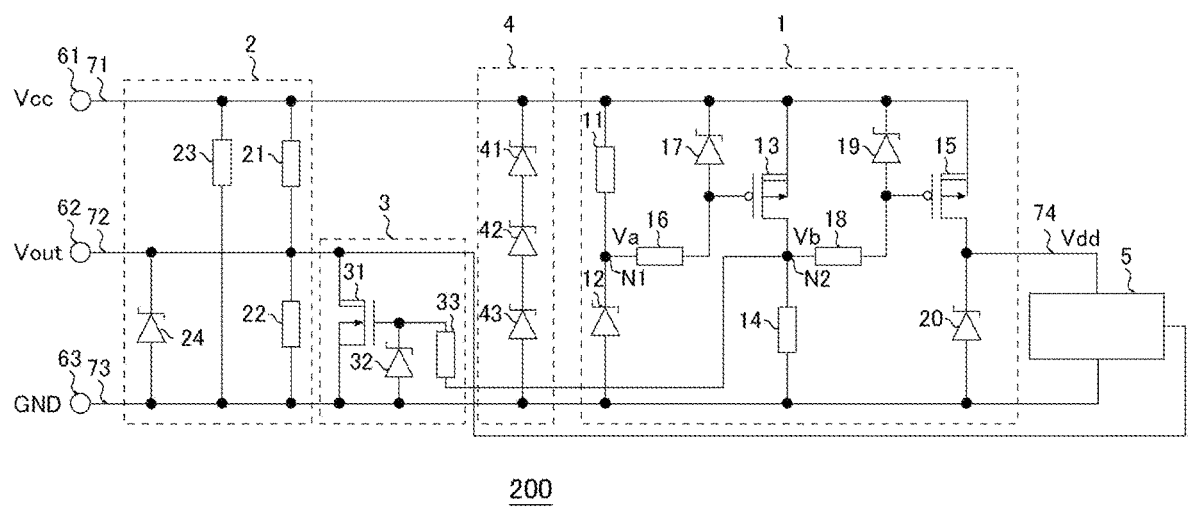
FIG. 4 shows an example of a configuration of a semiconductor circuit 200 according to another embodiment of the present invention.

FIG. 4 shows an example of a configuration of a semiconductor circuit 200 according to another embodiment of the present invention. The semiconductor circuit 200 of this example includes the overvoltage protection unit 1, the disconnection detection unit 2, the state notification unit 3, the reverse connection protection unit 4, and the load circuit 5. The semiconductor circuit 200 of this example is different from the semiconductor circuit 100 in FIG. 1 in that the overvoltage protection unit 1, the disconnection detection unit 2, and the state notification unit 3 further have a protection circuit. The rest of the configuration of the semiconductor circuit 200 may be similar to the configuration of the semiconductor circuit 100.

The overvoltage protection unit 1 has a resistance element 16, a Zener diode 17, a resistance element 18, a Zener diode 19, and a Zener diode 20, in addition to the configuration in FIG. 1. The resistance element 16 may have one end connected to the connecting point N1 and the other end connected to the gate terminal of the protection transistor 13. In other words, the resistance element 16 may be provided between the connecting point N1 and the gate terminal of the protection transistor 13. Providing the resistance element 16 can suppress current flowing from the power terminal 61 to the reference potential terminal 63 and protect the gate terminal of the protection transistor 13. Note that no resistance element 16 needs to be provided when a gate film thickness of the protection transistor 13 is large enough.

The Zener diode 17 may have a cathode connected to the internal power line 71 and an anode connected to the gate terminal of the protection transistor 13. Providing the Zener diode 17 can prevent overvoltage from being applied between source gates of the protection transistor 13.

The resistance element 18 may have one end connected to the connecting point N2 and the other end connected to the gate terminal of the output transistor 15. In other words, the resistance element 18 may be provided between the connecting point N2 and the gate terminal of the output transistor 15. Providing the resistance element 18 can suppress the current flowing from the power terminal 61 to the reference potential terminal 63 and protect the gate terminal of the output transistor 15. Note that no resistance element 18 needs to be provided when a gate film thickness of the output transistor 15 is large enough.

The Zener diode 19 may have a cathode connected to the internal power line 71 and an anode connected to the gate terminal of the output transistor 15. Providing the Zener diode 19 can prevent overvoltage from being applied between source gates of the output transistor 15.

The Zener diode 20 may have an anode connected to the internal reference potential line 73 and a cathode connected to the output line 74. Providing the Zener diode 20 can protect the load circuit 5.

The disconnection detection unit 2 has a Zener diode 24 in addition to the configuration in FIG. 1. The Zener diode 24 may have a cathode connected to the internal state notification line 72 and an anode connected to the internal reference potential line 73. Providing the Zener diode 24 can protect an external circuit connected to the output terminal 62.

The state notification unit 3 has a Zener diode 32 and a resistance element 33 in addition to the configuration in FIG. 1. The Zener diode 32 may have a cathode connected to the gate terminal of the state notification switch 31 and an anode connected to the internal reference potential line 73. Providing the Zener diode 32 can prevent overvoltage from being applied between source gates of the state notification switch 31.

The resistance element 33 may have one end connected to the connecting point N2 and the other end connected to the gate terminal of the state notification switch 31. In other words, the resistance element 33 may be provided between the connecting point N2 and the gate terminal of the state notification switch 31. Providing the resistance element 33 can suppress the current flowing from the power terminal 61 to the reference potential terminal 63 and protect the gate terminal of the state notification switch 31. Note that no resistance element 33 needs to be provided when a gate film thickness of the state notification switch 31 is large enough.

The semiconductor circuit 200 in FIG. 4 further includes a protection circuit in addition to the configuration in FIG. 1. Therefore, risk for failure of the circuit can be further reduced when the power voltage Vcc is overvoltage.

Figure 5:
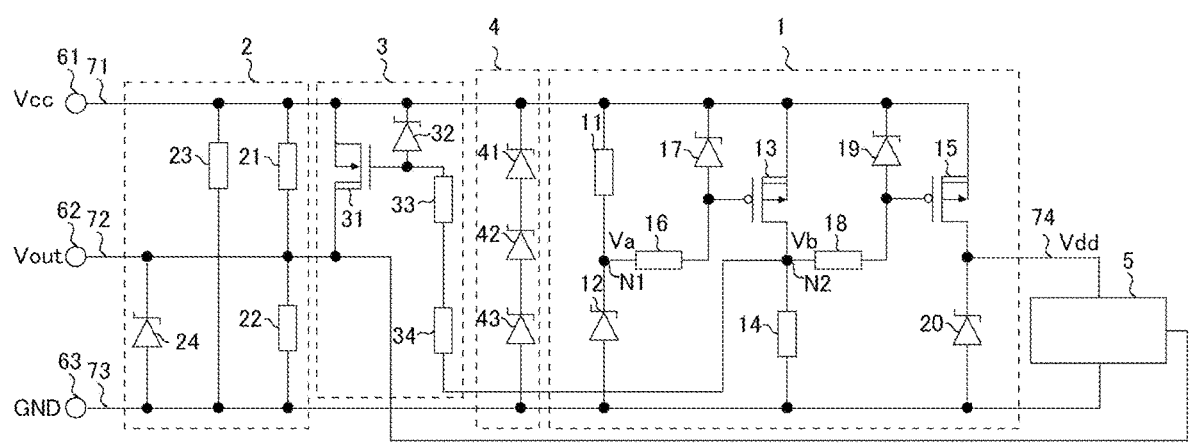
FIG. 5 shows an example of a configuration of a semiconductor circuit 300 according to another embodiment of the present invention.

FIG. 5 shows an example of a configuration of a semiconductor circuit 300 according to another embodiment of the present invention. The semiconductor circuit 300 of this example includes the overvoltage protection unit 1, the disconnection detection unit 2, the state notification unit 3, the reverse connection protection unit 4, and the load circuit 5. The semiconductor circuit 300 of this example is different from the semiconductor circuit 200 in FIG. 4 in that the configuration of the state notification unit 3 and the source terminal of the state notification switch 31 are connected to the internal power line 71. The rest of the configuration of the semiconductor circuit 300 may be similar to the configuration of the semiconductor circuit 200.

The state notification unit 3 may have the state notification switch 31, the Zener diode 32, the resistance element 33, and a booster circuit 34. The state notification switch 31 may be an N type high-voltage MOS transistor. Moreover, the state notification switch 31 may be a P type high-voltage MOS transistor. The source terminal of the state notification switch 31 may be connected to the internal power line 71. The drain terminal of the state notification switch 31 may be connected to the internal state notification line 72. The gate terminal of the state notification switch 31 may be connected to the connecting point N2. The Zener diode 32 may have an anode connected to the gate terminal of the state notification switch 31 and a cathode connected to the internal power line 71. The resistance element 33 may have one end connected to the connecting point N2 and the other end connected to the gate terminal of the state notification switch 31. The Zener diode 32 and the resistance element 33 are protection circuits that protect an internal circuit when overvoltage is applied.

The booster circuit 34 is a circuit that boosts the voltage at the connecting point N2. Aa a boosting method, the voltage Vb at the connecting point N2 may be boosted such that the state notification switch 31 is turned off when the output transistor 15 is on and the state notification switch 31 is turned on when the output transistor 15 is off. The booster circuit 34 may be realized with any known configuration.

By providing the booster circuit 34, when the power voltage Vcc is steady, the state notification switch 31 is brought into a high-impedance state and does not affect the output voltage Vout. On the other hand, when the power voltage Vcc is overvoltage, the impedance from the output terminal 62 to the power terminal 61 is lowered, and the output voltage Vout forcibly becomes the power voltage Vcc. When the output voltage Vout becomes the power voltage Vcc, the output voltage Vout will fall within the upper failure detection region in FIG. 2. Therefore, since it is possible to detect outside that the output voltage Vout has fallen within the upper failure detection region, the failure state can be detected on the high-order system side.

Figure 6:
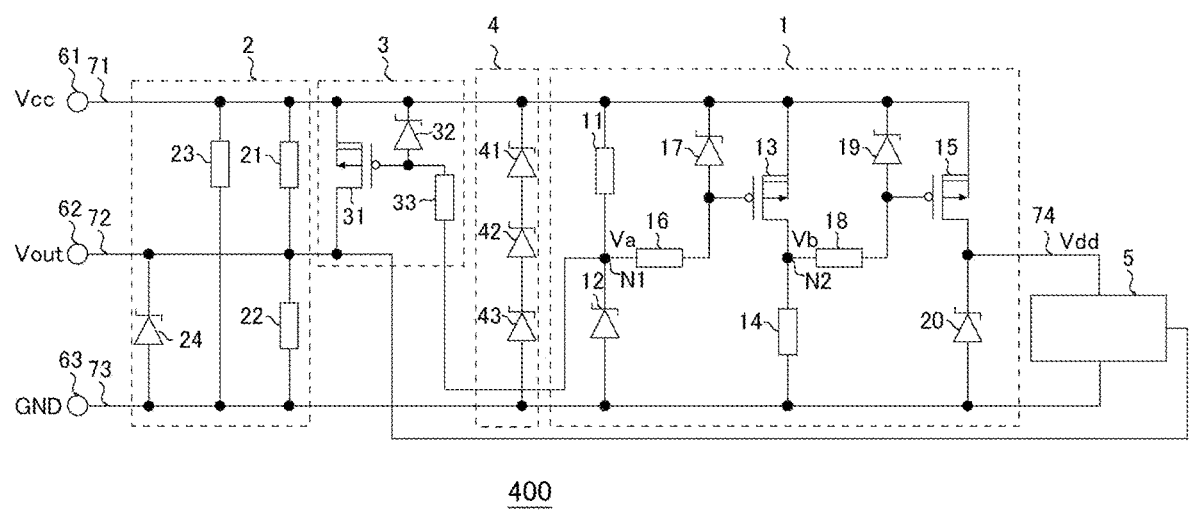
FIG. 6 shows an example of a configuration of a semiconductor circuit 400 according to another embodiment of the present invention.

FIG. 6 shows an example of a configuration of a semiconductor circuit 400 according to another embodiment of the present invention. The semiconductor circuit 400 of this example includes the overvoltage protection unit 1, the disconnection detection unit 2, the state notification unit 3, the reverse connection protection unit 4, and the load circuit 5. The semiconductor circuit 400 of this example is different from the semiconductor circuit 300 in FIG. 5 in that the configuration of the state notification unit 3 and the state notification unit 3 are connected to the connecting point N1. The rest of the configuration of the semiconductor circuit 400 may be similar to the configuration of the semiconductor circuit 300.

The state notification unit 3 may have the state notification switch 31, the Zener diode 32, and the resistance element 33. The state notification switch 31 may be a P type high-voltage MOS transistor. The source terminal of the state notification switch 31 may be connected to the internal power line 71. The drain terminal of the state notification switch 31 may be connected to the internal state notification line 72. The gate terminal of the state notification switch 31 may be connected to the connecting point N1. The Zener diode 32 may have an anode connected to the gate terminal of the state notification switch 31 and a cathode connected to the internal power line 71. The resistance element 33 may have one end connected to the connecting point N1 and the other end connected to the gate terminal of the state notification switch 31. The Zener diode 32 and the resistance element 33 are protection circuits that protect an internal circuit when overvoltage is applied.

The state notification switch 31 is a P type high-voltage MOS transistor, the gate terminal of which is connected to the connecting point N1. That is, the voltage Va at the connecting point N1 may be referred to as the voltage of the detection node. When the output transistor 15 is on (the power voltage Vcc is steady), the state notification switch 31 is turned off, and when the output transistor 15 is off (the power voltage Vcc is overvoltage), the state notification switch 31 is turned on. When the power voltage Vcc is steady, the state notification switch 31 is brought into a high-impedance state, and does not affect the output voltage Vout. On the other hand, when the power voltage Vcc is overvoltage, the impedance from the output terminal 62 to the power terminal 61 is lowered, and the output voltage Vout forcibly becomes the power voltage Vcc. The state notification switch 31 may switch between connecting and not connecting the internal state notification line 72 to the internal power line 71 depending on the voltage of the detection node (the voltage Va at the connecting point N1). When the output voltage Vout becomes the power voltage Vcc, the output voltage Vout will fall within the upper failure detection region in FIG. 2. Therefore, since it is possible to detect outside that the output voltage Vout has fallen within the upper failure detection region, the failure state can be detected on the high-order system side with a simple circuit configuration. The voltage Va at the connecting point N1 may be detected as the voltage of the detection node.

Moreover, the state notification switch 31 may be an N type high-voltage MOS transistor. When the state notification switch 31 is an N type high-voltage MOS transistor, a booster circuit may be provided on the gate terminal side of the state notification switch 31. The booster circuit may boost the voltage Va at the connecting point N1 such that the state notification switch 31 is turned off when the output transistor 15 is on and the state notification switch 31 is turned on when the output transistor 15 is off. The booster circuit may be realized with any known configuration.

Figure 7:
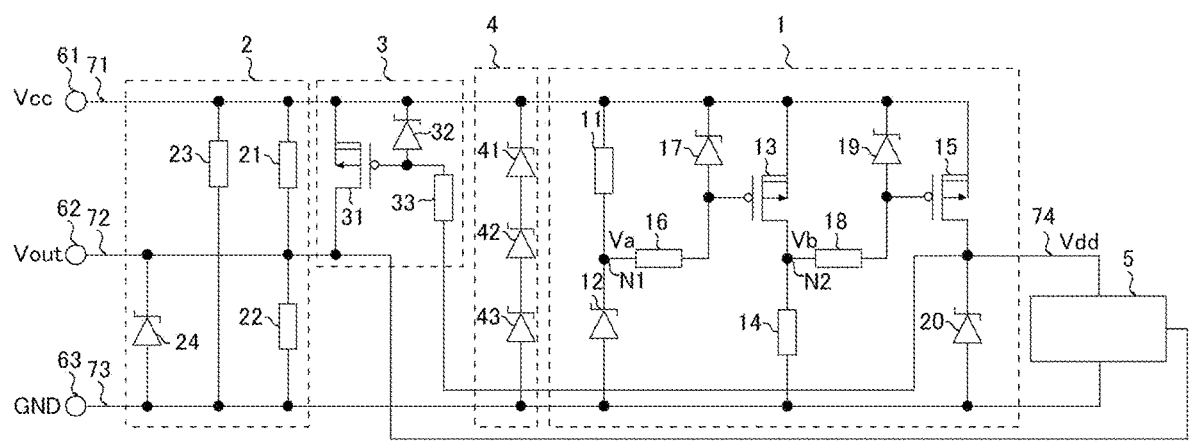
FIG. 7 shows an example of a configuration of a semiconductor circuit 500 according to another embodiment of the present invention.

FIG. 7 shows an example of a configuration of a semiconductor circuit 500 according to another embodiment of the present invention. The semiconductor circuit 500 of this example includes the overvoltage protection unit 1, the disconnection detection unit 2, the state notification unit 3, the reverse connection protection unit 4, and the load circuit 5. The semiconductor circuit 500 of this example is different from the semiconductor circuit 400 in FIG. 6 in that the state notification unit 3 is connected to the output line 74. The rest of the configuration of the semiconductor circuit 500 may be similar to the configuration of the semiconductor circuit 400.

The state notification unit 3 may have the state notification switch 31, the Zener diode 32, and the resistance element 33. The state notification switch 31 may be a P type high-voltage MOS transistor. The gate terminal of the state notification switch 31 may be connected to the output line 74.

The state notification switch 31 is a P type high-voltage MOS transistor, the gate terminal of which is connected to the output line 74. That is, the supply voltage Vdd supplied by the output transistor 15 to the load circuit 5 may be referred to as the voltage of the detection node. The state notification switch 31 is turned off when the output transistor 15 is on (the power voltage Vcc is steady), and the state notification switch 31 is turned on when the output transistor 15 is off (the power voltage Vcc is overvoltage). When the power voltage Vcc is steady, the state notification switch 31 is brought into a high-impedance state, and does not affect the output voltage Vout. On the other hand, when the power voltage Vcc is overvoltage, the impedance from the output terminal 62 to the power terminal 61 is lowered, and the output voltage Vout forcibly becomes the power voltage Vcc. The state notification switch 31 may switch between connecting and not connecting the internal state notification line 72 to the internal power line 71 according to the supply voltage Vdd of the detection node. When the output voltage Vout becomes the power voltage Vcc, the output voltage Vout will fall within the upper failure detection region in FIG. 2. Therefore, since it is possible to detect outside that the output voltage Vout has fallen within the upper failure detection region, the failure state can be detected on the high-order system side with a simple circuit configuration.

The state notification unit 3 may detect the supply voltage Vdd of the output line 74 as the voltage of the detection node.

Moreover, the state notification switch 31 may be an N type high-voltage MOS transistor. When the state notification switch 31 is an N type high-voltage MOS transistor, a booster circuit may be provided on the gate terminal side of the state notification switch 31. The booster circuit may boost the supply voltage Vdd such that the state notification switch 31 is turned off when the output transistor 15 is on and the state notification switch 31 is turned on when the output transistor 15 is off. The booster circuit may be realized with any known configuration.

Figure 8:
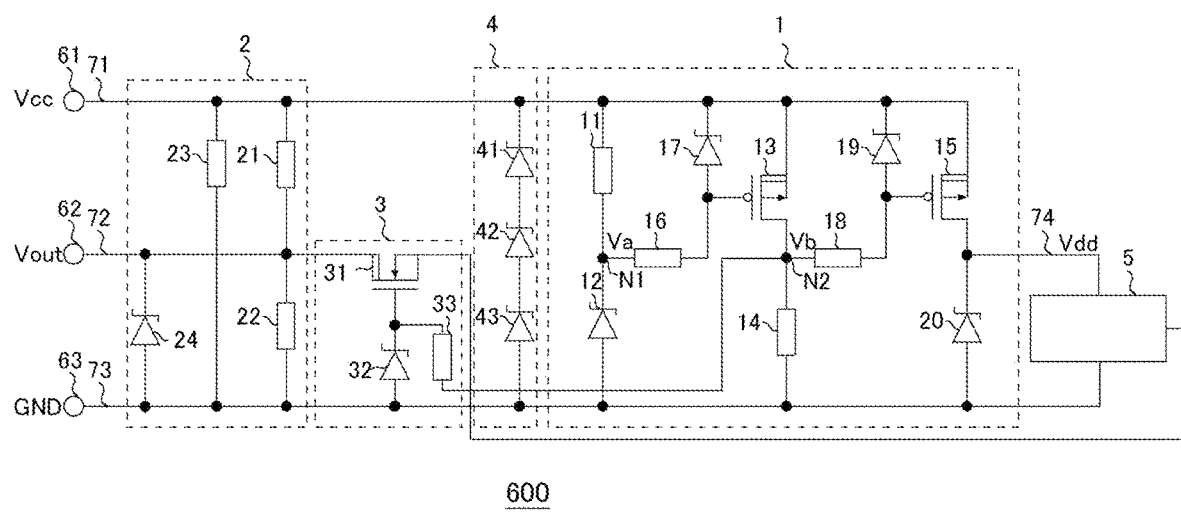
FIG. 8 shows an example of a configuration of a semiconductor circuit 600 according to another embodiment of the present invention.

FIG. 8 shows an example of a configuration of a semiconductor circuit 600 according to another embodiment of the present invention. The semiconductor circuit 600 of this example includes the overvoltage protection unit 1, the disconnection detection unit 2, the state notification unit 3, the reverse connection protection unit 4, and the load circuit 5. The semiconductor circuit 600 of this example is different from the semiconductor circuit 200 in FIG. 4 in that the configuration of the state notification unit 3 and the source terminal of the state notification switch 31 are connected to the load circuit 5. The rest of the configuration of the semiconductor circuit 600 may be similar to the configuration of the semiconductor circuit 200.

The state notification unit 3 may have the state notification switch 31, the Zener diode 32, and the resistance element 33. The state notification switch 31 may be an N type high-voltage MOS transistor. The source terminal of the state notification switch 31 may be connected to the load circuit 5. The drain terminal of the state notification switch 31 may be connected to the internal state notification line 72. The gate terminal of the state notification switch 31 may be connected to the connecting point N2. The Zener diode 32 may have a cathode connected to the gate terminal of the state notification switch 31 and an anode connected to the internal reference potential line 73. The resistance element 33 may have one end connected to the connecting point N2 and the other end connected to the gate terminal of the state notification switch 31. The Zener diode 32 and the resistance element 33 are protection circuits that protect an internal circuit when overvoltage is applied.

The state notification switch 31 is an N type high-voltage MOS transistor, the gate terminal of which is connected to the connecting point N2. That is, the voltage Vb at the connecting point N2 may be referred to as the voltage of the detection node. The state notification switch 31 is turned off when the output transistor 15 is on (the power voltage Vcc is steady), and the state notification switch 31 is turned on when the output transistor 15 is off (the power voltage Vcc is overvoltage). When the power voltage Vcc is steady, the state notification switch 31 is brought into a high-impedance state, and does not affect the output voltage Vout. On the other hand, when the power voltage Vcc is overvoltage, the impedance from the output terminal 62 to the load circuit 5 is lowered, and the output voltage Vout forcibly becomes the output voltage of the load circuit 5. Since the output voltage of the load circuit 5 becomes almost the ground voltage GND at the time of overvoltage, the output voltage Vout forcibly becomes the ground voltage GND. The state notification switch 31 may switch between connecting and not connecting the internal state notification line 72 to the load circuit 5 depending on the voltage of the detection node (the voltage Vb at the connecting point N2). When the output voltage Vout becomes the ground voltage GND, the output voltage Vout will fall within the lower failure detection region in FIG. 2. Therefore, since it is possible to detect outside that the output voltage Vout has fallen within the lower failure detection region, the failure state can be detected on the high-order system side with a simple circuit configuration.

Figure 9:
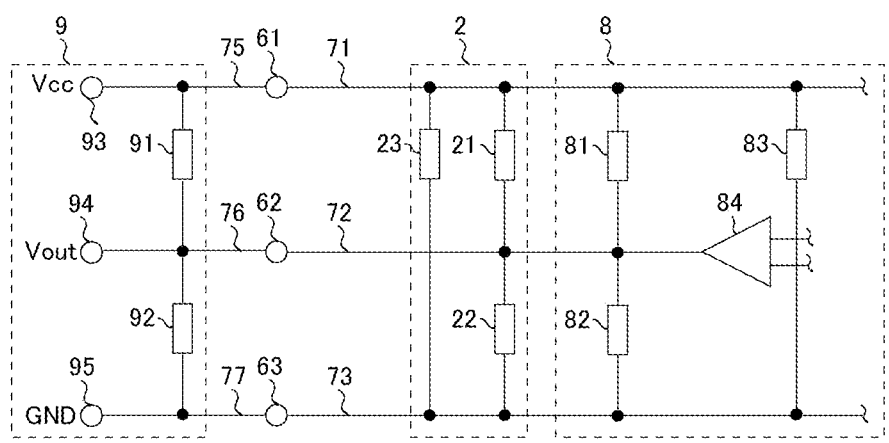
FIG. 9 shows a configuration of a semiconductor circuit 700 for describing operation of a disconnection detection unit 2.

FIG. 9 shows a configuration of a semiconductor circuit 700 for describing operation of a disconnection detection unit 2. The semiconductor circuit 700 is a circuit in which an external circuit 9 is connected to the semiconductor circuit 100 shown in FIG. 1. The semiconductor circuit 700 of this example includes the disconnection detection unit 2, a synthetic circuit 8, and the external circuit 9. Moreover, the semiconductor circuit 700 of this example includes the power terminal 61, the output terminal 62, the reference potential terminal 63, the internal power line 71, the internal state notification line 72, the internal reference potential line 73, an external power line 75, an external state notification line 76, and an external reference potential line 77 in order to operate the disconnection detection unit 2, the synthetic circuit 8, and the external circuit 9. The disconnection detection unit 2 is similar to the disconnection detection unit 2 of the semiconductor circuit 100 shown in FIG. 1. The synthetic circuit 8 is a synthetic circuit of the overvoltage protection unit 1, the state notification unit 3, the reverse connection protection unit 4, and the load circuit 5 of the semiconductor circuit 100 shown in FIG. 1, a part of which is omitted. The external circuit 9 is an external circuit connected to the power terminal 61, the output terminal 62, and the reference potential terminal 63.

A configuration of the disconnection detection unit 2 is similar to that of semiconductor circuit 100 shown in FIG. 1. The disconnection detection unit 2 has the second resistance element 21, the third resistance element 22, and the fourth resistance element 23.

The synthetic circuit 8 has a resistance element 81, a resistance element 82, a resistance element 83, and an output stage amplifier 84. The resistance element 81 may have one end connected to the internal power line 71 and the other end connected to the internal state notification line 72. The resistance element 82 may have one end connected to the internal state notification line 72 and the other end connected to the internal reference potential line 73. The resistance element 83 may have one end connected to the internal power line 71 and the other end connected to the internal reference potential line 73. The output stage amplifier 84 is connected to the internal state notification line 72, and outputs a signal to the internal state notification line 72.

The external circuit 9 has a resistance element 91, a resistance element 92, a power terminal 93, an output terminal 94, and a reference potential terminal 95. The resistance element 91 may have one end connected to the external power line 75 and the other end connected to the external state notification line 76. The resistance element 92 may have one end connected to the external state notification line 76 and the other end connected to the external reference potential line 77. The power terminal 93 is a terminal to which the power voltage Vcc is supplied. The output terminal 94 is a terminal that outputs the output voltage Vout to the outside. The reference potential terminal 95 is a terminal to which the ground voltage GND is supplied. The power terminal 93, the output terminal 94, and the reference potential terminal 95 are respectively connected to the power terminal 61, the output terminal 62, and the reference potential terminal 63 via the external power line 75, the external state notification line 76, and the external reference potential line 77. As described in FIG. 2, when neither overvoltage nor disconnection failure has occurred, the output voltage Vout is varied in the range of the steady output region according to the applied pressure.

Figure 10:
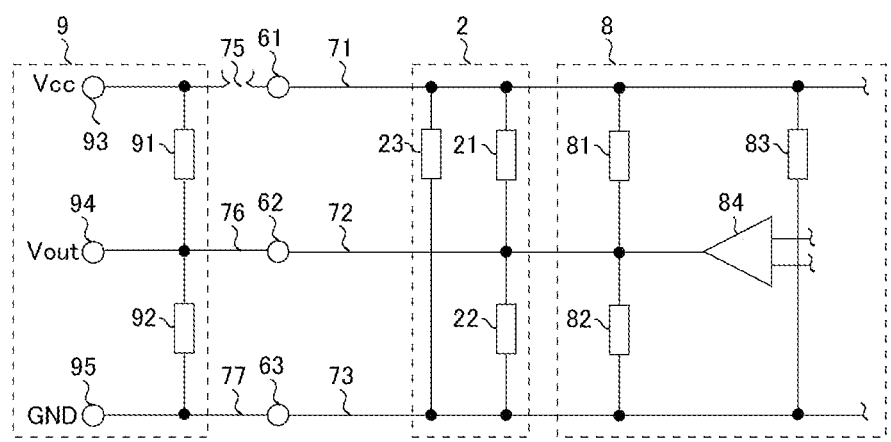
FIG. 10 shows a state in which an external power line 75 of the semiconductor circuit 700 in FIG. 9 is disconnected.

FIG. 10 shows a state in which the external power line 75 of the semiconductor circuit 700 in FIG. 9 is disconnected. The output voltage Vout for a case where the external power line 75 is disconnected is expressed as in the following formula 1. In the formula 1, a resistance value of the second resistance element 21 is R1, a resistance value of the third resistance element 22 is R2, a resistance value of the fourth resistance element 23 is R3, a resistance value of the resistance element 81 is R01, a resistance value of the resistance element 82 is R02, a resistance value of the resistance element 83 is R03, a resistance value of the resistance element 91 is R4, and a resistance value of the resistance element 92 is R5. Moreover, expression R1//R2 represents a combined resistance value for a case where the resistance element having the resistance value R1 and the resistance element having the resistance value R2 are connected in parallel. Moreover, expression R1//R2//R3 represents a combined resistance value for a case where the resistance element having the resistance value R1, the resistance element having the resistance value R2, and the resistance element having the resistance value R3 are connected in parallel.

$$Vout = \frac{R2//R02//R5//(R1//R01+R3//R03)}{\{R2//R02//R5//(R1//R01+R3//R03)+R4\}} Vcc \quad \text{[Formula 1]}$$

Since the fourth resistance element 23 is unrelated to output of the output stage amplifier 84, the fourth resistance element 23 does not affect a voltage value of an output signal for a case where there is no disconnection. Moreover, changing the resistance value of the fourth resistance element 23 can change the output voltage Vout at the time of disconnection. In other words, adjusting the resistance value of the fourth resistance element 23 can adjust the output voltage Vout at the time of disconnection. When the external power line 75 is disconnected, the fourth resistance element 23 may be set such that the output voltage Vout falls within the range of the lower failure detection region in FIG. 2. The resistance value may be adjusted with a known method such as using a variable resistor.

Figure 11:
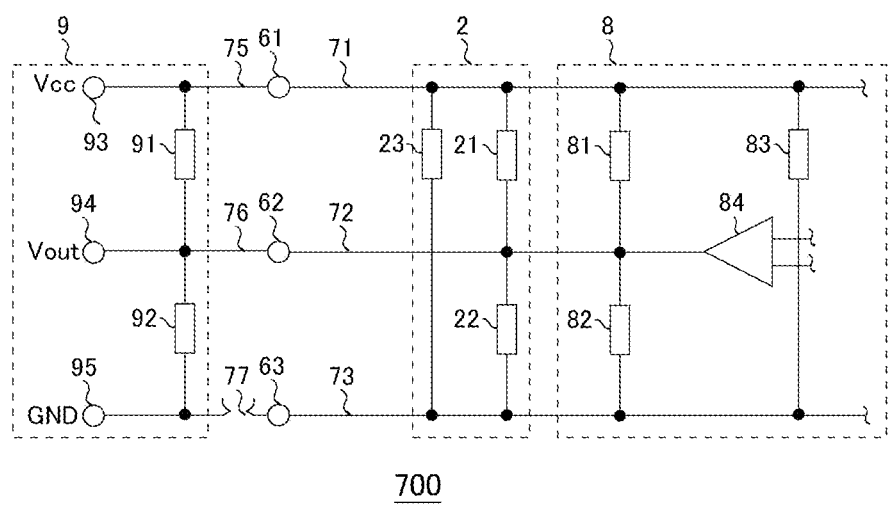
FIG. 11 shows a state in which an external reference potential line 77 of the semiconductor circuit 700 in FIG. 9 is disconnected.

FIG. 11 shows a state in which the external reference potential line 77 of the semiconductor circuit 700 in FIG. 9 is disconnected. The output voltage Vout for a case where the external reference potential line 77 is disconnected is expressed as in the following formula 2. Changing the resistance value of the fourth resistance element 23 can change the output voltage Vout at the time of disconnection. In other words, adjusting the resistance value of the fourth resistance element 23 can adjust the output voltage Vout at the time of disconnection. When the external reference potential line 77 is disconnected, the fourth resistance element 23 may be set such that the output voltage Vout falls within the range of the upper failure detection region in FIG. 2.

$$Vout = \frac{R5}{\{R1//R01//R4//(R2//R02+R3//R03)+R5\}} Vcc \quad \text{[Formula 2]}$$

Figure 12:
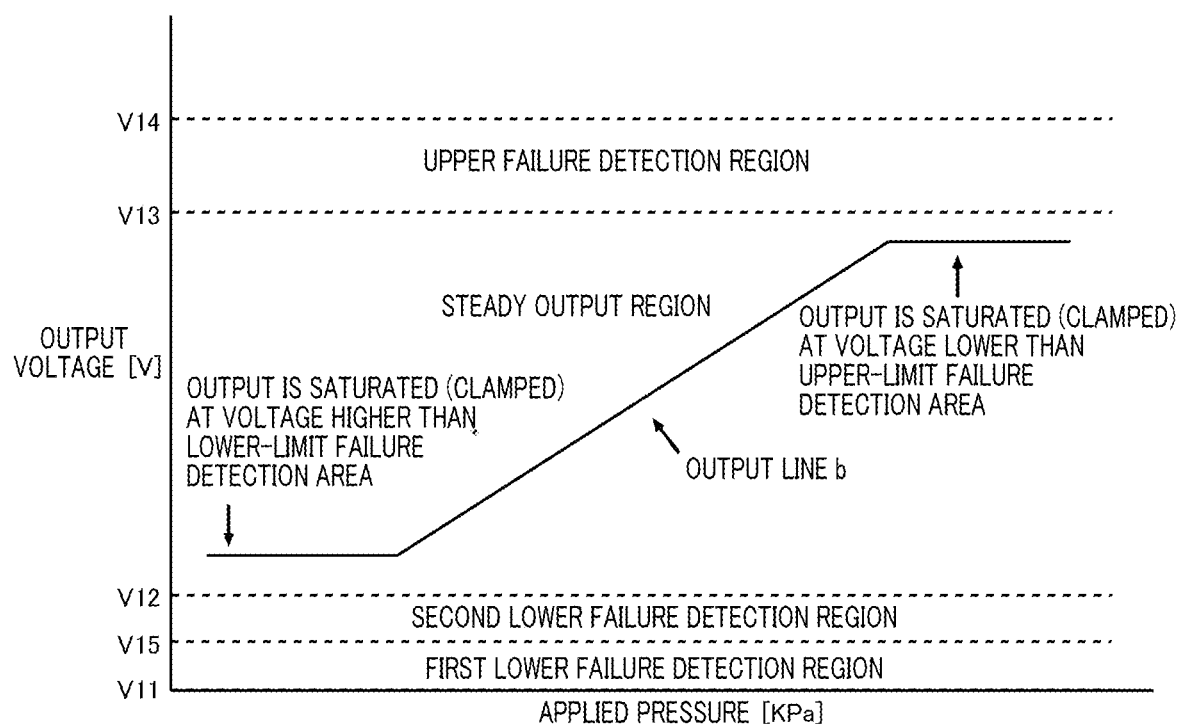
FIG. 12 shows an example of an output voltage Vout characteristic of an output stage amplifier 84 of the semiconductor circuit 700 in FIG. 9.

FIG. 12 shows an example of an output voltage Vout characteristic of the output stage amplifier 84 of the semiconductor circuit 700 in FIG. 9. As in FIG. 2, when neither overvoltage nor disconnection failure has occurred, the output voltage Vout of the output stage amplifier 84 is varied in the range of the steady output region according to the applied pressure as indicated by an output line b. The range of the steady output region refers to a range from V12 to V13. As an example, the range from V12 to V13 is a range from 0.2V to 4.8V. A saturation voltage (clamp voltage) of the output stage amplifier 84 is set such that the output of the output stage amplifier 84 does not fall within the upper-limit failure detection region and the lower-limit failure detection region.

When the external reference potential line 77 is disconnected, the resistance value of the fourth resistance element 23 may be adjusted such that the output voltage Vout falls within the range of the upper failure detection region. The range of the upper failure detection region refers to a range from V13 to V14. As an example, the range from V13 to V14 is a range from 4.8V to 5.0V.

When the external power line 75 is disconnected, the resistance value of the fourth resistance element 23 may be adjusted such that the output voltage Vout falls within the range of the lower failure detection region. The range of the lower failure detection region refers to a range from V11 to V12. As an example, the range from V11 to V12 is a range from 0.0V to 0.2V. Moreover, the resistance value of the fourth resistance element 23 is adjusted such that the output voltage Vout falls within the range of the range of the upper failure detection region when the external reference potential line 77 is disconnected and the output voltage Vout falls within the range of the lower failure detection region when the external power line 75 is disconnected, so that the disconnecting point can be easily identified.

As described above, when the power voltage Vcc is overvoltage, the output voltage Vout becomes a value close to 0.0V. To distinguish between a case where the power voltage Vcc is overvoltage and a case where the external power line 75 is disconnected, the resistance value of the fourth resistance element 23 may be adjusted such that the output voltage Vout falls within a first lower failure detection region when the power voltage Vcc is overvoltage and the output voltage Vout falls within a second lower failure detection region when the external power line 75 is disconnected. A range of the first lower failure detection region refers to a range from V11 to V15. As an example, the range from V11 to V15 is a range from 0.0V to 0.1V. A range of the second lower failure detection region refers to a range from V15 to V12. As an example, the range from V15 to V12 is a range from 0.1V to 0.2V. In other words, the internal state notification line 72 may transmit the state signal and the disconnection signal to the outside in different voltage ranges. Providing the first lower failure detection region and the second lower failure detection region allows distinction between the case where the power voltage Vcc is overvoltage and the case where the external power line 75 is disconnected.

Figure 13:
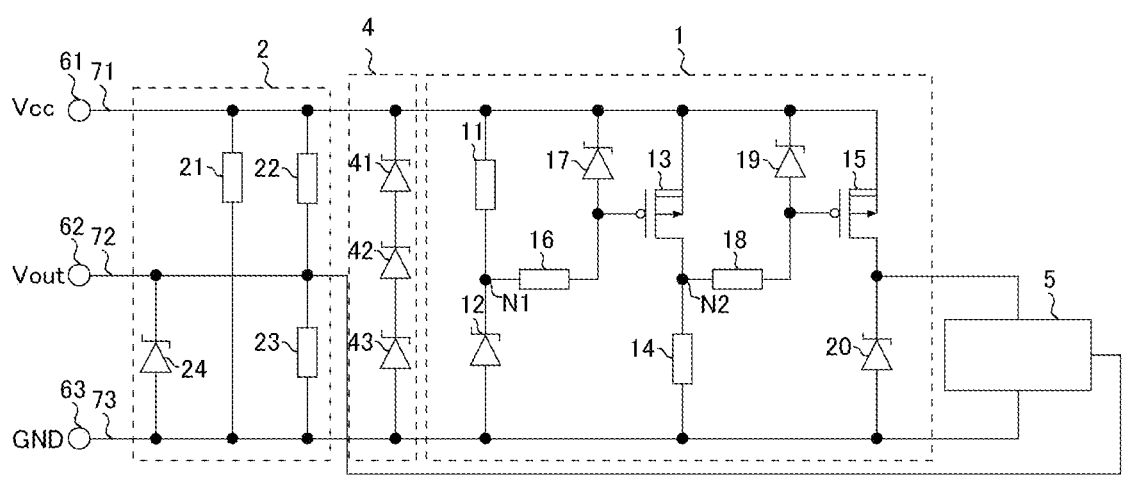
FIG. 13 shows an example of a configuration of a semiconductor circuit 800 according to a comparative example.

FIG. 13 shows an example of a configuration of a semiconductor circuit 800 according to a comparative example. The semiconductor circuit 800 of this example includes the overvoltage protection unit 1, the disconnection detection unit 2, the reverse connection protection unit 4, and the load circuit 5. The semiconductor circuit 800 of this example is different from the semiconductor circuit 200 in FIG. 4 in that the semiconductor circuit 800 has no state notification unit 3. The rest of the configuration in FIG. 13 may be similar to the configuration in FIG. 4.

The semiconductor circuit 800 according to this example has the overvoltage protection unit 1 like the semiconductor circuit 200 in FIG. 4. Therefore, the voltage supply can be interrupted when the power voltage Vcc is overvoltage. On the other hand, the semiconductor circuit 800 according to this example has no state notification unit 3 unlike the semiconductor circuit 200 in FIG. 4. As such, the semiconductor circuit 800 according to this example cannot notify the outside of an overvoltage state.

Figure 14:
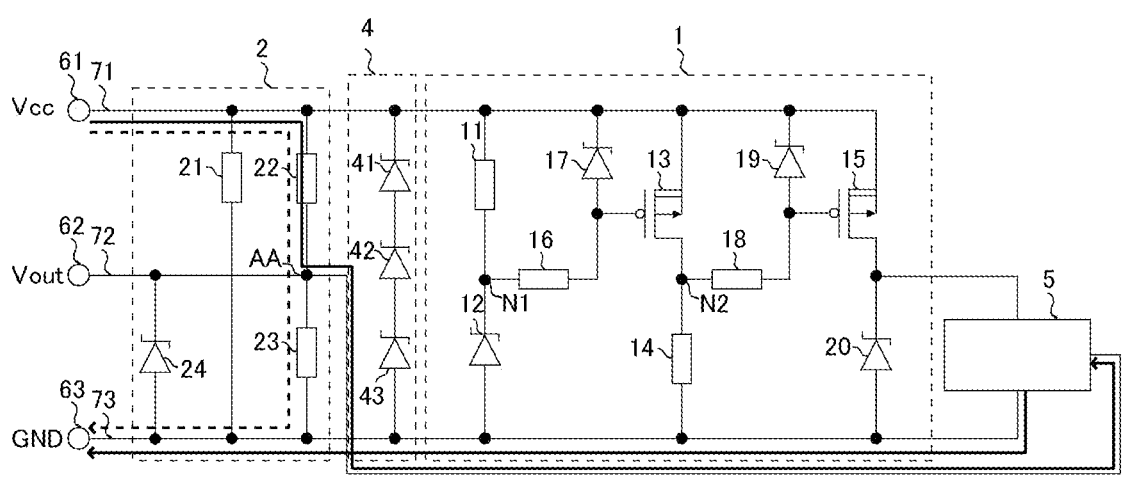
FIG. 14 illustrates a current path of the semiconductor circuit 800 in FIG. 13.

FIG. 14 illustrates a current path of the semiconductor circuit 800 in FIG. 13. When the power voltage Vcc becomes overvoltage, a current path through which current flows going around from the disconnection detection unit 2 to the load circuit 5 and a path through which current flows from the third resistance element 22 to the fourth resistance element 23 are generated. A thick line in FIG. 14 represents the current path through which the current flows going around from the disconnection detection unit 2 to the load circuit 5. A thick dotted line in FIG. 14 represents the current path through which current flows from the third resistance element 22 to the fourth resistance element 23. Voltage at a voltage-dividing point (voltage at a connecting point AA) between combined resistance of a current path through which current flows going around from the connecting point AA between the third resistance element 22 and the fourth resistance element 23 to the load circuit 5 and a current path through which current flows from the connecting point AA to the fourth resistance element 23, and resistance of the third resistance element 22, is outputted as the output voltage Vout.

Figure 15:
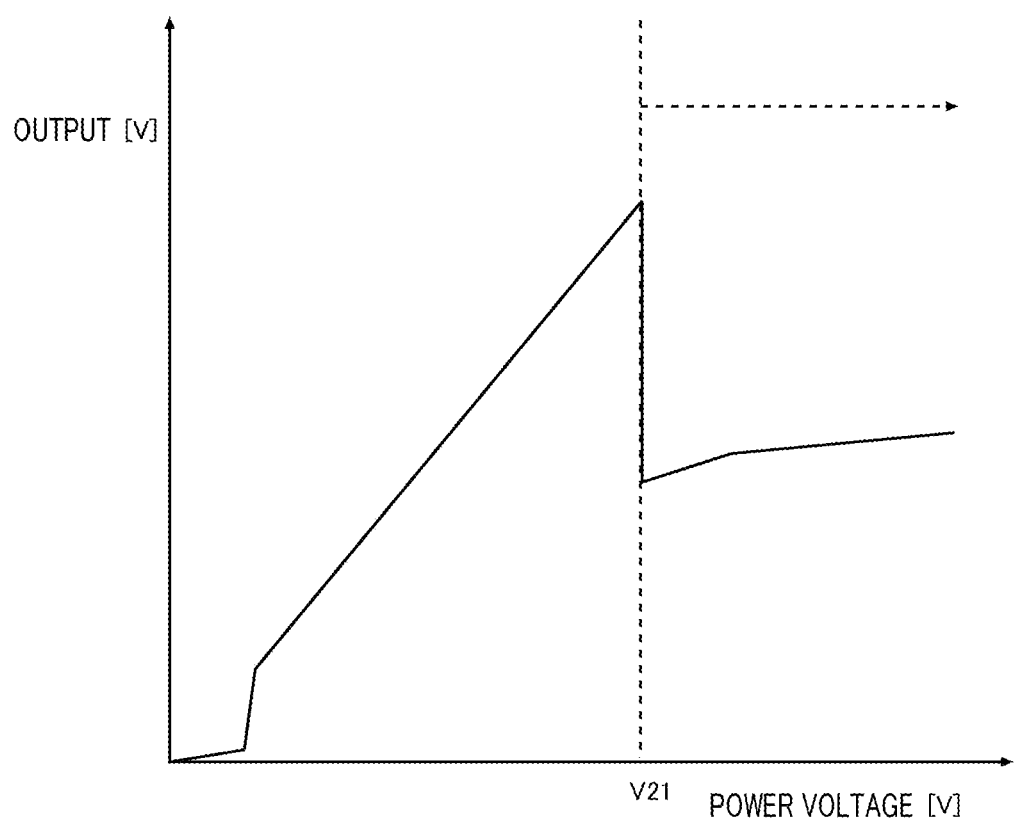
FIG. 15 shows a relationship between an output voltage Vout and a power voltage Vcc of the semiconductor circuit 800 according to a comparative example.

FIG. 15 shows a relationship between an output voltage Vout and a power voltage Vcc of the semiconductor circuit 800 according to a comparative example. When the power voltage Vcc is steady (when the power voltage Vcc is lower than or equal to V21), the output voltage Vout is varied between V12 and V13 shown in FIG. 2. V21 is the sum of the breakdown voltage of the Zener diode 12 and the threshold voltage of the protection transistor 13.

On the other hand, when the power voltage Vcc is overvoltage (when the power voltage Vcc exceeds V21), the output voltage Vout becomes the voltage at the voltage-dividing point between the combined resistance of the current path through which current flows going around from the connecting point AA to the load circuit 5 and the current path through which current flows from the connecting point AA to the fourth resistance element 23, and the resistance of the third resistance element 22. The output voltage Vout in this case is not lower than or equal to voltage at which the active element used inside the load circuit 5 operates. For example, when the semiconductor circuit 800 is formed on a silicon substrate, the output voltage Vout is higher than or equal to 0.6V. As such, the output voltage Vout is fixed in the steady output region. Therefore, the semiconductor circuit 800 according to this example cannot notify the outside of an overvoltage state when the power voltage Vcc is overvoltage.

While the embodiments of the present invention have been described, the technical scope of the invention is not limited to the above described embodiments. It is apparent to persons skilled in the art that various alterations and improvements can be added to the above-described embodiments. Moreover, not all combinations of features described in the embodiments are necessary to solutions of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: overvoltage protection unit, 2: disconnection detection unit, 3: state notification unit, 4: reverse connection protection unit, 5: load circuit: 8: synthetic circuit, 9: external circuit, 11: first resistance element, 12: Zener diode, 13: protection transistor, 14: resistance element, 15: output transistor, 16: resistance element, 17: Zener diode, 18: resistance element, 19: Zener diode, 20: Zener diode, 21: second resistance element, 22: third resistance element, 23: fourth resistance element, 24: Zener diode, 31: state notification switch, 32: Zener diode, 33: resistance element, 34: booster circuit, 41: Zener diode, 42: Zener diode, 43: Zener diode, 61: power terminal, 62: output terminal, 63: reference potential terminal, 71: internal power line, 72: internal state notification line, 73: internal reference potential line, 74: output line, 75: external power line, 76: external state notification line, 77: external reference potential line, 81: resistance element, 82: resistance element, 83: resistance element, 84: output stage amplifier, 91: resistance element, 92: resistance element, 93: power terminal, 94: output terminal, 95: reference potential terminal, 100: semiconductor circuit, 200: semiconductor circuit, 300: semiconductor circuit, 400: semiconductor circuit, 500: semiconductor circuit, 600: semiconductor circuit, 700: semiconductor circuit, 800: semiconductor circuit

What is claimed is:

1. A semiconductor circuit connected to a load circuit and configured to control power supply to the load circuit, comprising:
   a power line to which a power voltage is applied;
   an overvoltage protection unit that has an output unit configured to interrupt power supply from the power line to the load circuit when the power voltage in the power line is overvoltage;
   a state notification unit configured to notify an external circuit different from the load circuit of a state signal indicating whether the output unit is interrupting the power supply; and
   a state notification line configured to output voltage from the load circuit and the state signal to the external circuit.

2. The semiconductor circuit according to claim 1, wherein the state notification line is configured to output the voltage from the load circuit and the state signal to the external circuit in different voltage ranges.

3. The semiconductor circuit according to claim 1, wherein the state notification unit is configured to generate the state signal based on voltage of a detection node for which potential is different in the overvoltage protection unit depending on whether the power supply is being interrupted or the power supply is not being interrupted.

4. The semiconductor circuit according to claim 2, wherein the state notification unit is configured to generate the state signal based on voltage of a detection node for which potential is different in the overvoltage protection unit depending on whether the power supply is being interrupted or the power supply is not being interrupted.

5. The semiconductor circuit according to claim 3, further comprising a reference potential line to which a reference potential is applied, wherein
the state notification unit has a state notification switch configured to switch between connecting and not connecting the state notification line to the reference potential line depending on the voltage of the detection node.

6. The semiconductor circuit according to claim 3, wherein the state notification unit has a state notification switch configured to switch between connecting and not connecting the state notification line to the power line depending on the voltage of the detection node.

7. The semiconductor circuit according to claim 3, wherein the state notification unit has a state notification switch configured to switch between connecting and not connecting the state notification line to the load circuit depending on the voltage of the detection node.

8. The semiconductor circuit according to claim 5, further comprising an output line connected to the load circuit, wherein
the output unit is an output transistor configured to switch between connecting and not connecting the power line to the output line, and
the state notification unit is configured to detect voltage of a gate terminal of the output transistor as the voltage of the detection node.

9. The semiconductor circuit according to claim 6, further comprising an output line connected to the load circuit, wherein
the output unit is an output transistor configured to switch between connecting and not connecting the power line to the output line, and
the state notification unit is configured to detect voltage of a gate terminal of the output transistor as the voltage of the detection node.

10. The semiconductor circuit according to claim 8, wherein
the overvoltage protection unit further has a protection transistor that is provided between the power line and the reference potential line and that is configured to select either voltage corresponding to the power voltage or voltage corresponding to the reference potential depending on magnitude of the power voltage, to apply the selected voltage to a gate terminal of the output transistor, and
the state notification unit is configured to detect voltage outputted by the protection transistor to the gate terminal as the voltage of the detection node.

11. The semiconductor circuit according to claim 5, further comprising:
an output line connected to the load circuit, wherein
the output unit is an output transistor configured to switch between connecting and not connecting the power line to the output line,
the overvoltage protection unit further has:
a Zener diode;
a first resistance element connected in series to the Zener diode; and
a protection transistor that is provided between the power line and the reference potential line, that has a gate terminal to which voltage at a connecting point between the Zener diode and the first resistance element is applied, and that is configured to select either voltage corresponding to the power voltage or voltage corresponding to the reference potential, to apply the selected voltage to a gate terminal of the output transistor, and
the state notification unit is configured to detect the voltage at the connecting point between the Zener diode and the first resistance element as the voltage of the detection node.

12. The semiconductor circuit according to claim 5, further comprising an output line connected to the load circuit, wherein
the output unit is an output transistor configured to switch between connecting and not connecting the power line to the output line, and
the state notification unit is configured to detect voltage of the output line as the voltage of the detection node.

13. The semiconductor circuit according to claim 5, further comprising:
a disconnection detection unit connected to the power line, the reference potential line, and the state notification line, wherein
the disconnection detection unit is configured to notify the external circuit of a disconnection signal indicating whether the in-vehicle semiconductor circuit is disconnected.

14. The semiconductor circuit according to claim 13, wherein the disconnection detection unit has:
a second resistance element connected between the power line and the state notification line;
a third resistance element connected between the state notification line and the reference potential line; and
a fourth resistance element connected between the power line and the reference potential line.

15. The semiconductor circuit according to claim 13, wherein the state notification line is configured to output the disconnection signal to the external circuit.

16. The semiconductor circuit according to claim 15, wherein the state notification line is configured to output the voltage from the load circuit, the state signal, and the disconnection signal to the external circuit in different voltage ranges.

17. The semiconductor circuit according to claim 1, wherein the load circuit is a pressure sensor.

18. The semiconductor circuit according to claim 1, wherein the semiconductor circuit is an in-vehicle semiconductor circuit.

19. A semiconductor circuit connected to a load circuit and configured to control power supply to the load circuit, comprising:
a power line to which a power voltage is applied;
an overvoltage protection unit that has an output unit configured to interrupt power supply from the power line to the load circuit when the power voltage in the power line is overvoltage;
a state notification unit configured to notify an external circuit different from the load circuit of a state signal indicating whether the output unit is interrupting the power supply;
a disconnection detection unit configured to notify the external circuit of a disconnection signal indicating whether the semiconductor circuit is disconnected; and
a state notification line configured to output voltage from the load circuit, the state signal, and the disconnection signal to the external circuit.

20. The semiconductor circuit according to claim 19, wherein the load circuit is a pressure sensor.

* * * * *